(12) United States Patent
Huffer

(10) Patent No.: US 10,220,999 B2
(45) Date of Patent: Mar. 5, 2019

(54) EXPANDABLE EASY OPENING DOUGH PACKAGE

(71) Applicant: SONOCO DEVELOPMENT, INC, Hartsville, SC (US)

(72) Inventor: Scott William Huffer, Hartsville, SC (US)

(73) Assignee: Sonoco Develoment, Inc., Hartsville, SC (US)

(\*) Notice: Subject to any disclaimer, the term of this patent is extended or adjusted under 35 U.S.C. 154(b) by 775 days.

(21) Appl. No.: 14/616,246

(22) Filed: Feb. 6, 2015

(65) Prior Publication Data

US 2016/0229614 A1 Aug. 11, 2016

(51) Int. Cl.

| | |
|---|---|
| *B65D 65/14* | (2006.01) |
| *B65D 65/40* | (2006.01) |
| *B65D 75/58* | (2006.01) |
| *B65D 85/72* | (2006.01) |
| *B65D 75/26* | (2006.01) |
| *B32B 7/12* | (2006.01) |
| *B32B 15/04* | (2006.01) |
| *B32B 15/08* | (2006.01) |
| *B32B 27/32* | (2006.01) |
| *B32B 27/36* | (2006.01) |
| *B29C 65/00* | (2006.01) |
| *B32B 3/26* | (2006.01) |

(52) U.S. Cl.
CPC .......... *B65D 75/5833* (2013.01); *B29C 65/00* (2013.01); *B32B 3/266* (2013.01); *B32B 7/12* (2013.01); *B32B 15/04* (2013.01); *B32B 15/08* (2013.01); *B32B 27/32* (2013.01); *B32B 27/36* (2013.01); *B65D 75/26* (2013.01); *B32B 2255/10* (2013.01); *B32B 2307/31* (2013.01); *B32B 2307/4023* (2013.01); *B32B 2307/412* (2013.01); *B32B 2307/546* (2013.01); *B32B 2307/7244* (2013.01); *B32B 2307/7246* (2013.01); *B32B 2307/7265* (2013.01); *B32B 2307/732* (2013.01); *B32B 2307/75* (2013.01); *B32B 2435/02* (2013.01); *B32B 2439/40* (2013.01); *B32B 2439/70* (2013.01); *B65D 85/72* (2013.01); *B65D 2205/025* (2013.01)

(58) Field of Classification Search
CPC ............ B65D 75/5833; B65D 75/5838; B65D 75/5855; B65D 75/26; B32B 3/266; B32B 3/26; B32B 7/12; B32B 7/06
See application file for complete search history.

(56) References Cited

U.S. PATENT DOCUMENTS

| | | | |
|---|---|---|---|
| 2,870,022 A * | 1/1959 | Anderson | B65D 75/10 426/128 |
| 5,251,809 A | 10/1993 | Drummond et al. | |
| 5,851,613 A * | 12/1998 | Perlman | A61F 13/2051 15/104.94 |
| 6,517,243 B2 | 2/2003 | Huffer et al. | |
| 6,602,529 B1 | 8/2003 | Lonergan et al. | |
| 7,235,274 B2 | 6/2007 | Archibald et al. | |

(Continued)

*Primary Examiner* — Erik Kashnikow
*Assistant Examiner* — Lela S. Williams
(74) *Attorney, Agent, or Firm* — Miller, Matthias & Hull LLP

(57) ABSTRACT

An easy opening flexible package is provided. The package is suitable for containing raw dough and other products, especially products that create pressure within the package by expansion or by giving off gas such as carbon dioxide.

16 Claims, 3 Drawing Sheets

Before dough expansion

(56) References Cited

U.S. PATENT DOCUMENTS

| | | |
|---|---|---|
| 2003/0230604 A1 | 12/2003 | Huffer |
| 2007/0080078 A1 | 4/2007 | Hansen et al. |
| 2010/0021591 A1 | 1/2010 | Domingues et al. |
| 2011/0177214 A1 | 6/2011 | Domingues et al. |
| 2013/0004626 A1* | 1/2013 | Renders ................ B65D 33/02 426/121 |
| 2014/0308408 A1 | 10/2014 | Domingues et al. |
| 2016/0137377 A1* | 5/2016 | Tracy ....................... B32B 3/26 222/566 |
| 2016/0176600 A1* | 6/2016 | Branyon ............ B65D 75/5827 383/207 |

* cited by examiner

Before dough expansion

After dough expansion

EXPANDABLE EASY OPENING DOUGH PACKAGE

BACKGROUND OF THE INVENTION

Field of the Invention

This invention patent relates to an expandable easy opening package. More particularly, this invention relates to a flexible package having an easy opening feature especially suitable for holding raw dough under pressure.

Description of the Related Art

Dough for cookies and biscuits and the like is purchased predominately in composite cans having metal ends. The cylindrical can is rigid and strong enough to hold the internal pressures as the newly made dough expands to fill the internal space. When the can label is removed, the can body bursts open along a spiral seam to release the internal pressure, allowing access to the dough.

Dough cans must be engineered to accommodate certain natural phenomena caused by the packaged dough. For example, the gas which occupies the empty headspace in the dough can after it is immediately filled needs to be vented as the expanding dough takes up the empty space in the can and displaces this gas. Also, carbon dioxide ($CO_2$) given off by the dough during its shelf life needs to be vented to prevent unwanted (premature) bursting. The headspace gas and $CO_2$ venting typically is accomplished through a small opening in the seam between the metal ends and the composite can body.

The present invention provides an alternative to conventional composite dough cans.

BRIEF SUMMARY OF THE INVENTION

The present invention is an easy opening flexible package, suitable for holding raw dough and other products, especially products that create pressure by expanding within the package.

The flexible package may be made of a laminate film comprising a flexible scored inner layer and a flexible scored outer layer substantially coextensive with and laminated to the inner layer by a pressures sensitive adhesive and a permanent adhesive. The inner layer may comprise a barrier layer. The outer layer may be transparent and may bear reverse printing on an inner facing surface. A metal foil layer may be interposed between the inner layer and the outer layer. The laminate film can now be rolled up to form a cylindrical package having a pull tab for opening.

The pressure sensitive adhesive is pattern applied or otherwise located in a first predetermined pattern on the outer facing surface of the inner layer. The first predetermined pattern may be U-shaped and comprise two elongated sides and a bottom connecting the sides of the "U".

The permanent adhesive may be pattern applied or otherwise located in a second predetermined pattern on the outer facing surface of the inner layer outside of the first predetermined pattern, i.e., i.e., outside the U-shaped region of the pressure sensitive adhesive.

A heat seal is disposed between the inner layer and the outer layer along an area of the inner layer that will be scored to create and undercut. The heat seal is designed to hold the undercut closed until a predetermined length of a pull tab is lifted from the package.

The undercut is formed by laser scoring or other suitable means in the inner layer within an area underlying the heat seal. The undercut has a starter end near a gripping end of the pull tab. The undercut may be linear and may extend spirally around part of the cylindrical package.

The overcut is formed by laser scoring or other suitable means in the outer layer in substantial registration with the pressure sensitive adhesive and substantially surrounds the undercut. The overcut may be U-shaped and defines the perimeter of the pull tab.

The flexible package may be cylindrical shaped and have a volume and opposing ends. One or more frangible seams may be formed in the package that fracture in response to internal pressure, expanding the package volume and relieving any internal pressure caused by, for example, dough expansion.

One or more tortuous paths (vents) may be formed in one or both ends of the package to release gas during the shelf life of the package contents.

Preferably the permanent adhesive does not cover a non-adhesive area on the outer surface of the inner layer located under a gripping end of the pull tab so that the gripping end is free and can be easily lifted by a user.

To use the package, the use pulls on the pull tab. When a sufficient length of the undercut is exposed the heat seal fails and the undercut bursts open under pressure, exposing the contents of the package.

Micro-perforations may be formed in the inner layer, under the pull tab, between the undercut and the non-adhesive area, to release a small amount of pressure to lessen the bursting effect when the package is opened.

In another aspect of disclosure a method of making a flexible easy opening package is provided, comprising the steps of:

providing an inner layer of flexible material and an outer layer of flexible material in sheet form;

pattern applying a pressure sensitive adhesive to an outer facing surface of the inner layer in a first predetermined area of the inner layer;

drying the pressure sensitive adhesive on the inner layer;

applying a permanent adhesive onto the outer facing surface of the inner layer in a second predetermined area such that the permanent adhesive does not cover the pressure sensitive adhesive;

applying a heat seal to the outer facing surface of the inner layer;

adhesively joining the inner layer and the outer layer via the pressure sensitive adhesive and the permanent adhesive to form a laminate film;

forming an undercut in the inner layer which is in substantial registration with the heat seal; and forming an overcut in the outer layer 16 substantially in registration with the pressure sensitive adhesive, the overcut defining an elongated pull tab.

The method may include the additional step of forming micro-perforations in the inner layer in an area of the inner layer that, upon lifting the pull tab, is exposed before the undercut.

The heat seal may be formed according the following steps:

applying a sealant to an outer facing surface of the inner layer;

applying a sealant coating on top of the sealant; and heating the sealant coating and the sealant to form the heat seal.

DETAILED DESCRIPTION OF THE INVENTION

Figure 1:
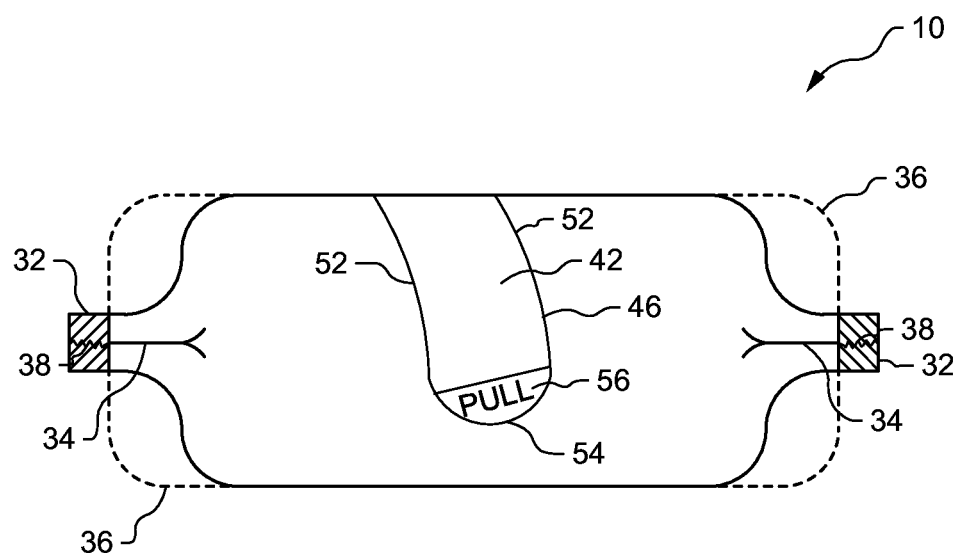
FIG. 1 is a perspective view of a dough package according to the disclosure after being initially filled with dough.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Turning to the drawings, there is shown in the figures one embodiment of the present invention, a flexible dough package 10 having a package expansion feature, a vent feature and an easy opening feature. At its most general, the package 10 is made from a laminate film 12 such as that shown in FIG. 5 and comprises a scored inner layer 14 and a scored outer layer 16 laminated together with both permanent adhesive 18 and pressure sensitive adhesive 20.

The inner layer 14 may be made of polyolefin film or any suitable material and typically is about 30 to 70 microns thick. The inner layer 14 may also comprise multiple layers of various materials, including for example, a barrier layer providing a barrier against the passage of oxygen and/or moisture, and a sealant layer. The inner layer 14 has an inner facing (product facing) surface 22 and an outer facing surface 24.

The outer layer 16 may be made of polyester film or any suitable material and typically is about 30 microns thick. The outer layer 16 has an inner facing surface 26 and an outer facing surface 28. The outer layer 16 may be transparent and may bear reverse printing on its inner facing surface 26. Prior to being joined to the inner layer 14, the inner facing surface 26 of the outer layer 16 can be treated by a corona discharge or similar apparatus to render the inner facing surface 26 more receptive to ink and/or more readily bondable to the pressure-sensitive adhesive 20.

An optional metallization layer or foil layer (not shown in the figures) may be interposed between the inner layer 14 and the outer layer 16. The metallization layer or foil layer can be helpful in preventing a laser from penetrating through the entire thickness of the laminate film 10 as described more fully below.

Figure 2:
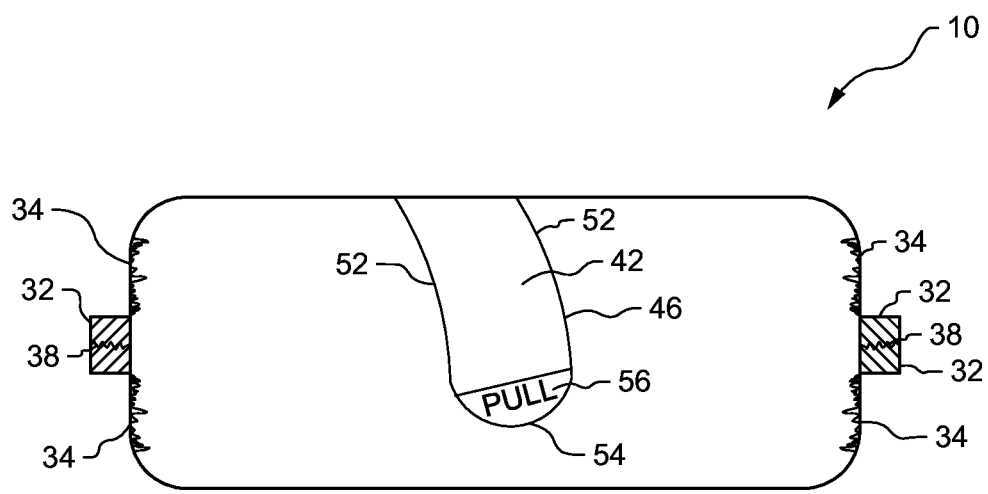
FIG. 2 is a perspective view of the dough package of FIG. 1 after the dough has expanded.
Figure 3:
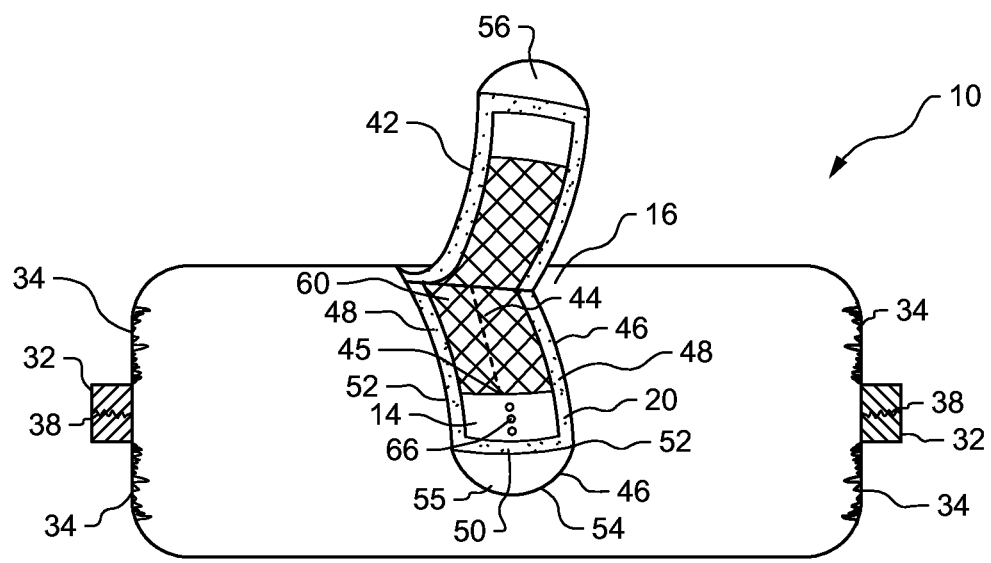
FIG. 3 is a perspective view of the dough package of FIG. 2 after the pull tab has been lifted but before the package bursts.

The package 10 may be filled with raw dough or other suitable content 30 and then closed at one or both ends 32, preferably by heat sealing the ends 32. The package 10 may be generally cylindrically shaped as shown in FIGS. 1 to 3 or have any other suitable shape.

The package 10 may have one or more of the following features:

Package Expansion Feature (Frangible Seam)

When raw dough 30 is initially placed into the package 10 the dough 30 can expand. Providing an expandable package 10 to let the dough 30 expand eliminates or minimizes the need to include headspace in the package 10 as it is initially filled. To accomplish this, the package 10 may have one or more built-in frangible seams 34 that can fracture (break) at the interface of the frangible seam bond, expanding the package volume and relieving any internal pressure caused by the dough expansion.

Each frangible seam 34 can be formed by folding the laminate film 12 to create a seam or folded area, and then securing the seam or folded area in place using a heat activated seal coating, heat seal web or other suitable means. If a heat activated seal coating is used, the coating may be pattern applied over the seam 34. Alternatively, a heat seal web may be coextruded with the package film under low temperature. The outer facing surface of the heat activated seal coating or the heat seal web may be corona treated to provide a print receptive surface.

The pattern of each frangible seam 34 can be varied based on the shape of the initial filled package 10 and the final desired shape of the expanded package 10. For example, the frangible seams 34 may take the shape of fins on a package that will morph into a larger diameter after expanding. Different dough formulas may require different expansion seam configurations. Multiple frangible seams can be added to the package 10 even if some never deploy during expansion of the package 10.

FIG. 1 is a perspective view of a flexible dough package 10 according to the disclosure after being initially filled with dough 30. The dough 30 occupies most or all of the interior space of the package 10 and the frangible seams 34 are intact (unbroken). However, as the dough 30 expands, the frangible seams 34 are broken which allows the package 10 to expand until it occupies the larger volume indicated by the broken lines 36.

FIG. 2 is a perspective view of the dough package 10 of FIG. 1 after the expanding dough 30 has caused the package 10 to expand. The frangible seams 34 are shown in their broken state, and the package 10 now occupies the volume indicated by the broken lines 36 in FIG. 1.

Venting Feature

Even after the dough 30 expands, the dough 30 can give off carbon dioxide ($CO_2$) during the shelf life of the dough. The $CO_2$ needs to be vented outside the package 10 to prevent unwanted (premature) bursting of the package 10. To achieve this, one or more vents 38 can be formed in one or both ends 32 of the package 10 by micro-perforating one or both ends 32 with a laser, or by leaving a tortuous path 38 in the heat sealed end 32 to allow gas such as $CO_2$ to escape. This venting feature takes the place of the seam vent(s) found in conventional dough cans between the metal ends and the composite can body.

The length of the tortuous path 38 typically is about 1500 times the diameter to be effective. The tortuous path 38 remains closed and the interior of the package 10 isolated from the surroundings until the interior and the tortuous path 38 are subjected to sufficient pressure. When sufficient pressure is built up from, say, $CO_2$, the gas can exit the package 10 through the tortuous path in a process referred to as diffusion. The dough 30 may caulk (seal) the vent 38 after the gas has been vented, or the vent 38 may automatically seal itself when the tortuous path pressure is reduced.

Alternatively, the package 10 may be made using suitable films that are $CO_2$ gas permeable and selected to allow gas transmission through the laminate film 12 during the lifetime of the package contents 30.

Easy Opening Feature

The dough package 10 may include an easy opening feature which allows the package 10 to burst open only after the user pulls sufficiently on a pull tab 42.

The easy opening feature requires the double layer laminated film 12 described above. Permanent and pressure sensitive adhesives are applied between the inner and outer layers in predetermined patterns. Once the laminate film 12 is formed, precise scoring operations are performed on either side of the laminate film 12 in registration with the adhesive patterns or in registration with a heat seal 60, with each scoring operation only penetrating through one layer of the laminate film 12. For example, a substantially linear undercut 44 is formed in the inner layer 14 in registration with a heat seal 60 without cutting or scoring the outer layer 16. Likewise, a generally U-shaped overcut 46 is formed in the outer layer 16 in registration with the pressure sensitive adhesive pattern 20 without cutting or scoring the inner layer 14. The scoring operations result in a package 10 having a pull tab 42 that, when lifted a sufficient amount, exposes the heat sealed undercut 44, causing the package 10 to burst along the undercut 44 and exposing the contents 30.

FIG. 3 is a perspective view of a dough package 10 after the pull tab 42 has been partially lifted but before the package 10 has burst. The undercut 44 is exposed but remains intact due to the heat seal 60.

Preferably the undercut 44 extends spirally around part of the substantially cylindrical package 10, and may extend from near one end 32 of the package 10 to near an opposite end 32. The undercut 44 may be formed with a laser, with a die cutting machine or by any suitable means and extends through the entire thickness or almost the entire thickness of the inner layer 14 but not the outer layer 16. If the dough package 10 has a metallized layer or foil layer, then the metallized layer or foil layer can serve as a natural stop for the laser. Because of the undercut 44, the inner layer 14 will be weak enough to burst open along the exposed undercut 44 when a predetermined length of the pull tab 42 is pulled away from the inner layer 14.

The pressure sensitive adhesive (PSA) 20 is pattern applied to the outer facing surface 24 of the inner layer 14 on either side of the area that will become the undercut 44. The PSA 20 may be applied in substantially a U-shape, with the sides 48 of the "U" being substantially coextensive with the undercut 44 and the bottom 50 of the "U" connecting the sides 48 along an area beyond the starter end 45 of the undercut 44, i.e., the end 45 of the undercut 44 that is first exposed when the pull tab 42 is pulled.

The overcut 46 may form a U-shaped pattern with side cuts 52 connected by an end cut 54 to define the elongated pull tab 42. The side cuts 52 may be located on either side of the undercut 44 and preferably are substantially co-extensive with the undercut 44. The overcut 46 preferably is formed in registration with the PSA 20. That is, the overcut 46 should substantially overlap the PSA 20 so that the pull tab 42 is releasable from the inner layer 14. The overcut 46 may be formed with a laser, with a die cutting machine or by any suitable means and may extend through the entire thickness or almost the entire thickness of the outer layer 16. Preferably the overcut 46 substantially surrounds the undercut 44.

The permanent adhesive 18 may be applied to the outer facing surface 24 of the inner layer 14 so that the permanent adhesive 18 does not cover the PSA 20. Preferably the permanent adhesive 18 does not cover the (non-adhesive) area 55 of the inner layer 14 located under the free gripping end 56 of the pull tab 42 so that the gripping end 56 is not adhered to the inner layer 14. More specifically, the permanent adhesive 18 is located in an area outside the region defined by the pressure sensitive adhesive 20.

A heat seal 60 is disposed between the inner layer 14 and the outer layer 16 overlaying the undercut 44 to hold the undercut closed until a sufficient length of the pull tab 42 is lifted from the package 10. The heat seal 60 may be made by heating a sealant 62 and a sealant coating 64 as will now be explained. The heat seal 60 should hold the undercut 44 closed but not permanently adhere to the outer layer 16.

Figure 4:
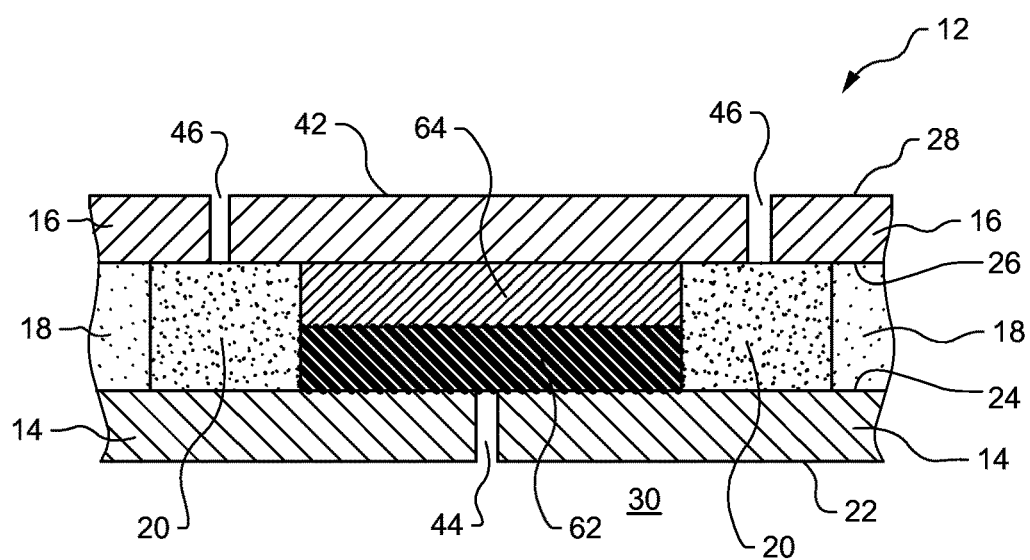
FIG. 4 is a close up cross-sectional view of a laminate used to make the dough package of FIG. 2 before heat is applied to the sealant and sealant coating covering the undercut.

To make the heat seal 60, a sealant 62 may be applied to the outer facing surface 24 of the inner layer 14 so that it covers the undercut 44, and a sealant coating 64 may be applied on top of the sealant 62 as shown in FIG. 4. When the sealant 62 and sealant coating 64 are heated, they form the heat seal 60 shown in FIG. 5. As already noted, the heat seal 60 can withstand the internal pressure forces of the dough package 10 until the pull tab 42 is sufficiently pulled away from the inner layer 14.

Optional micro-perforations 66 may be formed in the inner layer 14 where it underlies the top portion of the pull tab 42 to relieve pressure and mitigate the bursting effect caused when the pull tab 42 is pulled. The micro-perforations 66 should be located in an area of the inner layer 14 that, upon lifting the pull tab 42, is exposed just before the undercut 44 is exposed. For example, the micro-perforations 66 may be located in a linear array of three within the elongated rectangular area defined by the PSA 20, under the pull tab 42, and between the undercut 44 and the adhesive-free area 55 as shown in FIG. 3.

Figure 5:
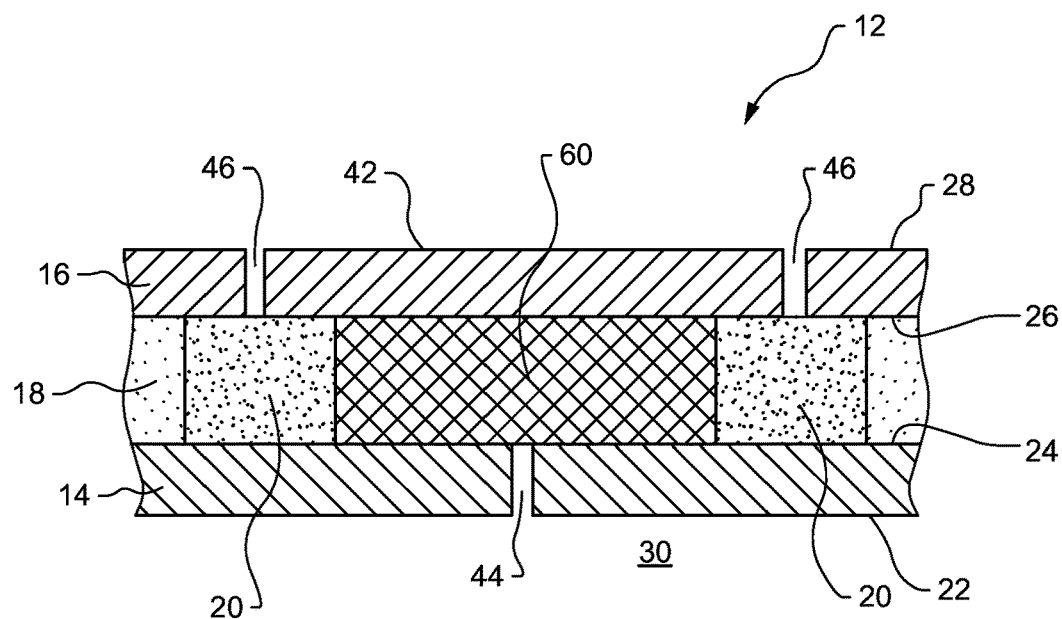
FIG. 5 is a close up cross-sectional view of the laminate of FIG. 3 after heat has been applied to the sealant and heat seal coating to form a heat seal.

Referring to FIG. 5, the preferred structure of the package 10 is, from inside out, a scored barrier layer 14 of polyethylene terephthalate (PET), a middle adhesive layer comprising PSA 20 plus heat seal 60 plus permanent adhesive 18, and a scored outer layer 16 of PET. The inner facing surface 26 of the outer layer 16 may bear ink printing such as a product label.

Method of Making a Dough Package with Easy Opening Feature

An easy opening dough package 10 may be made in the following manner:

Providing an inner layer 14 of flexible material and an outer layer 16 of flexible material in sheet form.

Pattern applying a PSA 20 to an outer facing surface 24 of the inner layer 14 in a predetermined area of the inner layer 14. The pattern may be any suitable pattern but preferably is in a U-shape pattern having two substantially linear sides 48 connected at a bottom 50.

Drying the PSA 20 on the inner layer 14 at a drying station, such as an oven or the like.

Applying a permanent adhesive 18 onto the outer facing surface 24 of the inner layer 14 such that the permanent adhesive 18 does not cover the PSA 20. Preferably the permanent adhesive 18 also does not cover an area 55 of the inner layer 14 located under the gripping end 56 of the pull tab 42 so that the gripping end 56 is not adhered to the inner layer 14. However, the permanent adhesive 18 should cover a substantial portion of the inner layer 14 to permit it to be laminated to the outer layer 16.

Applying a sealant 62 to the outer facing surface 24 of the inner layer 14 which will be substantially coextensive with an undercut 44 to be formed in a subsequent step.

Applying a sealant coating 64 on top of the sealant 62.

Adhesively joining the inner layer 14 and the outer layer 16 via the PSA 20 and the permanent laminating adhesive 18 to form a laminate film 12. This may be accomplished using a laminating machine comprising two rollers forming a nip therebetween as known in the art. The inner layer 14 and the outer layer 16 should be substantially coextensive with each other during the laminating process. For example, if the layers are rectangular, the width and length of the inner layer 14 should match the width and length of the outer layer 16. The laminate 12 film may be rectangular or any shape suitable for forming a dough package 10, and preferably a cylindrical dough package 10.

Feeding a roll of the laminate film 12 to first scoring station, and scoring an undercut 44 in the inner layer 14. The undercut 44 may be linear or any suitable shape and may extend spirally around the finished package 10. The undercut 44 may be formed with a laser, with a die cutting machine or by any suitable means and may extend through the entire thickness or almost the entire thickness of the inner layer 14. The undercut 44 should be in registration with the sealant 62 and seal coating 64. That is, the undercut 44 should be made within the elongated rectangular-shaped area defined by the sealant 62 and seal coating 64 (which, as noted below, will be bonded under heat to form a heat seal 60).

Forming micro-perforations 38 in the inner layer 14 in an area of the inner layer 14 that, upon lifting the pull tab 42, is exposed before the undercut 44.

Forming an overcut 46 in an outer facing surface 28 of the outer layer 16. The overcut 46 preferably is formed substantially in registration with the PSA 20. That is, the overcut 46 should substantially overlap the PSA 20. In the illustrated example, the overcut 46 forms a U-shaped pattern with sides 52 connected by a curved bottom 54 to define an elongated pull tab 42. The sides 52 are located on either side of the undercut 44 and preferably are substantially co-extensive with the undercut 44. Preferably the curved bottom 54 extends outside the elongated rectangular area of the PSA 20 (and outside the area covered in permanent adhesive 18) to form the gripping end 56 that is not adhered to the inner layer 14. The overcut 46 may be formed with a laser, with a die cutting machine or by any suitable means and may extend through the entire thickness or almost the entire thickness of the outer layer 16.

Heating the laminate film 12 so that the sealant 62 and sealant coating 64 form a heat seal 60. In the finished package 10 the heat seal 60 will keep the undercut 44 closed until the pull tab 42 is sufficiently lifted away from the package body. The heating may be achieved with a heat roller or other suitable means. FIG. 5 is a close up cross-sectional view of the laminate film 12 after heat has been applied to form the heat seal 60.

The laminate film 12, shown in FIG. 5, can now be rolled up for use in packaging products. For example and without limitation, the laminate film 12 can be used to wrap raw dough 30 at a dough making facility. After the dough 30 is wrapped, the ends 32 may be sealed to create the filled dough package 10 shown in FIG. 1. The heat sealing may be accomplished by crimping, folding or otherwise closing off the ends 32 and then exposing the ends 32 to a temperature sufficient to at least partially melt the film so that it fuses or welds together to form a heat seal.

Preferably, the manufacturing process includes steps for making frangible seams 34 for package expansion and vents 38 for $CO_2$ gas release according to the following optional steps:

Forming one or more frangible seams 34 in the laminate film 12.

Forming a tortuous path 38 in one or both sealed ends 32.

Opening the Dough Package

The flexible dough package 10 can be opened by pulling the gripping end 56 formed in the outer layer 16 but not adhered to the inner layer 14. Once the gripping end 56 is pulled, the optional micro-perforations 66 are exposed, which gently releases some of the pressure within the package 10. Continued pulling on the gripping end 56 exposes more and more of the undercut 44. The heat seal 60 disposed over the undercut 44 may initially withstand the internal pressure forces of the dough package 10 until a sufficient length of the pull tab 42 is pulled away from the inner layer 14. Since the heat seal 60 ultimately cannot withstand the internal pressure, the package 10 essentially bursts open along the undercut 44 to expose the dough 30 for dispensing.

* * *

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A pressurized flexible package for holding contents under pressure, the package comprising:
   a flexible laminate film comprising a flexible inner layer and an outer layer coextensive with and laminated to the inner layer;
   an undercut formed only in the inner layer and having a starter end;
   an overcut formed only in the outer layer and surrounding the undercut, the overcut defining a pull tab region;
   a pressure sensitive adhesive located in a first predetermined pattern on the outer facing surface of the inner layer and in substantial registration with the overcut, the first predetermined pattern located within the pull tab region and comprising two elongated sides located on either side of the undercut and a bottom connecting the sides;
   a permanent adhesive located in a second predetermined pattern between the inner layer and the outer layer outside the pull tab region; and
   an easy opening feature formed in the package, the easy opening feature comprising:
   a pull tab formed in the outer layer and having a length and a perimeter defined by the overcut; and
   a heat seal disposed between the inner layer and the outer layer and in substantial registration with the undercut but not the overcut, the heat seal located within an area defined on three sides by the predetermined pattern of the pressure sensitive adhesive and on a fourth side by the second predetermined pattern; wherein
   the heat seal withstands internal pressure forces of the contents and remains intact until a predetermined length of the pull tab is pulled away from the inner layer, whereupon the heat seal is broken and the package bursts open along the undercut to expose the contents.

2. The flexible package of claim 1 wherein:
   the inner layer comprises a barrier layer.

3. The flexible package of claim 1 wherein the heat seal comprises:
   a sealant on top of the outer facing surface of the inner layer and covering the undercut, and
   a sealant coating on top of the sealant.

4. The flexible package of claim 1 further comprising:
   a metal foil layer interposed between the inner layer and the outer layer.

5. The flexible package of claim 1 wherein:
the flexible package is generally cylindrically shaped, has a volume and opposing ends, and is filled with raw dough.

6. The flexible package of claim 5 further comprising:
one or more frangible seams that fracture in response to internal pressure, expanding the package volume and relieving any internal pressure caused by dough expansion.

7. The flexible package of claim 5 further comprising:
one or more tortuous path vents formed in one or both ends of the package.

8. The flexible package of claim 1 wherein:
the undercut consists essentially of a single linear undercut.

9. The flexible package of claim 5 wherein:
the undercut extends spirally around part of the flexible package.

10. The flexible package of claim 1 wherein:
the first predetermined pattern is a U-shape;
the elongated sides are coextensive with the undercut; and
the bottom extends along an area beyond the starter end of the undercut.

11. The flexible package of claim 1 wherein:
the overcut has a U-shaped pattern comprising side cuts connected by an end cut.

12. The flexible package of claim 11 wherein:
the side cuts are located on either side of the undercut and are co-extensive with the undercut.

13. The flexible package of claim 11 wherein:
the overcut overlaps the first predetermined pattern so that the pull tab is releasable from the inner layer.

14. The flexible package of claim 1 wherein:
the permanent adhesive does not cover a non-adhesive area (55) of the inner layer located under a gripping end (56) of the pull tab so that the gripping end is not adhered to the inner layer.

15. The flexible package of claim 1 wherein:
the heat seal is adapted to withstand internal pressure forces of the flexible package until a sufficient length of the pull tab is pulled away from the inner layer.

16. A pressurized flexible package for holding contents under pressure, the package comprising:
a flexible laminate film comprising a flexible inner layer and an outer layer coextensive with and laminated to the inner layer;
an undercut formed only in the inner layer and having a starter end;
an overcut formed only in the outer layer and surrounding the undercut, the overcut defining a pull tab region;
a pressure sensitive adhesive located in a first predetermined pattern on the outer facing surface of the inner layer and in substantial registration with the overcut, the first predetermined pattern comprising two elongated sides located on either side of the undercut and a bottom connecting the sides;
a permanent adhesive located in a second predetermined pattern between the inner layer and the outer layer outside the pull tab region; and
an easy opening feature formed in the package, the easy opening feature comprising:
a pull tab formed in the outer layer and having a length and a perimeter defined by the overcut; and
a heat seal disposed between the inner layer and the outer layer and overlaying the undercut; wherein
the heat seal withstands internal pressure forces of the contents and remains intact until a predetermined length of the pull tab is pulled away from the inner layer, whereupon the heat seal is broken and the package bursts open along the undercut to expose the contents; and wherein
the permanent adhesive does not cover a non-adhesive area of the inner layer located under a gripping end of the pull tab so that the gripping end is not adhered to the inner layer;
the package further comprising micro-perforations formed in the inner layer between the undercut and the non-adhesive area, the micro-perforations underlying a top portion of the pull tab and located within an area of the inner layer that is completely sealed from the outside by the pressure sensitive adhesive and the heat seal, the area located between the bottom of the pressure sensitive adhesive pattern and the heat seal such that, upon lifting the pull tab, the micro-perforations are exposed before the undercut is exposed.

* * * * *